United States Patent

Lock et al.

[15] 3,687,493

[45] Aug. 29, 1972

[54] THREADED CONNECTION

[72] Inventors: Everett H. Lock, Houston, Tex. 77043; William C. Maurer, Houston, Tex. 77042

[73] Assignee: Esso Production Research Company

[22] Filed: March 1, 1971

[21] Appl. No.: 119,763

[52] U.S. Cl................285/333, 85/1 JP, 175/393, 285/286, 285/355, 285/422, 285/DIG. 10
[51] Int. Cl...............................................F16l 25/00
[58] Field of Search......285/333, 266, 334, 422, 355, 285/287, DIG. 10; 151/7; 85/15 P; 277/123, 125; 175/393, 417; 138/44

[56] References Cited

UNITED STATES PATENTS

| 2,246,436 | 6/1941 | Downey.....................285/347 |
| 3,002,770 | 10/1961 | Chesnut et al..........285/355 X |
| 3,212,411 | 10/1965 | Storms................285/DIG. 10 |
| 3,572,775 | 3/1971 | Bloom........................285/287 |
| 2,980,451 | 4/1961 | Taylor et al.............285/333 X |
| 3,061,455 | 9/1962 | Anthony....................85/1 L X |
| 3,101,207 | 8/1963 | Pavel et al. ............285/355 X |
| 3,403,929 | 10/1968 | Russell....................285/355 X |

*Primary Examiner*—Dave W. Arola
*Attorney*—James A. Reilly, John B. Davidson, Lewis H. Eatherton, James E. Gilchrist, Robert L. Graham and James E. Reed

[57] ABSTRACT

A threaded connection wherein an externally threaded member provided with a rubber gasket and a fluoroplastic protective ribbon is joined to an internally threaded member in a pressure-tight assembly.

12 Claims, 4 Drawing Figures

PATENTED AUG 29 1972  3,687,493

INVENTORS
EVERETT H. LOCK
WILLIAM C. MAURER
BY
ATTORNEY

THREADED CONNECTION

BACKGROUND OF THE INVENTION

1. Field of the Invention

The present invention relates to seals, gaskets, and similar packing elements for use in threaded connections.

2. Description of the Prior Art

Threaded connections are commonly used to join piping members such as tubing, fittings, valves, filters, rupture discs, instruments, flow nozzles, and the like. In high pressure service, the threaded connections are used only when it is not feasible to use welded connections or when one of the piping members must be periodically disconnected.

Most commercial piping components incorporate taper threads since this connection provides a metal-to-metal seal when the components are screwed together. In high pressure service fluid-tight seals across the threaded joint can be achieved only with the aid of gaskets or similar packing members. The primary function of a gasket is to fill the space between two mating members and thus provide a physical barrier for internal fluids. The assembly is designed to retain the gasket under compression. The degree of gasket compression determines the packing pressure and hence the sealing ability of the connection. Generally the contact surfaces of the mated components are configurated to provide a smooth and regular bearing surface on the gasket. The gasket thus undergoes a minimum of deformation in conforming to the contact surfaces as compressive forces are applied. However such sealing assemblies require specially machined parts designed to cooperate with the configuration of the gasket. Moreover, the degree of gasket compression attainable by such assemblies is somewhat limited.

Another type of threaded connection which employs gaskets comprises an externally threaded member provided with a circumferentially extending gasket and a mating internally threaded member. Such sealing assemblies, however, are not satisfactory for high pressure service. Experience has shown that the gasket is easily cut or damaged by the threads of the internal member as the parts are mated. When the gaskets are composed of plastic, high packing pressure causes the plastic material to extrude between the threads and thus destroy the pressure seal.

SUMMARY OF THE INVENTION

The present invention alleviates many of the difficulties associated with prior art sealing devices as applied in taper thread connection. Briefly, the assembly constructed according to the present invention comprises an externally threaded member, a rubber gasket mounted in a suitable groove formed in the threaded member, and a protective ribbon composed of a fluoroplastic, preferably polytetrafluoroethylene, which substantially covers the gasket and groove. This assembly is adapted to mate with an internally threaded member. The fluoroplastic protective ribbon can be in the form of tape wrapped several times around the circumference of the externally threaded member in such a manner that the gasket and groove are substantially covered. Ribbons composed of polytetrafluoroethylene have given particularly good results in the practice of the present invention. This resin, because of its anti-stick character and low coefficient of friction, permits the externally threaded member to be screwed into the internally threaded member without the gasket coming into contact with the sharp threads of the internally threaded member. The polytetrafluoroethylene ribbon further improves the sealing capability of the assembly by filling the space between the threads to a greater extent than that possible with rubber. At high pressures the polytetrafluoroethylene ribbon undergoes plastic deformation, cold flowing into intimate contact with the irregular surfaces of the threaded section. Tests have shown that the assembly constructed according to the present invention can effectively maintain internal pressures as high as 15,000 psi for several hours. Similar tests conducted on the assembly without the polytetrafluoroethylene ribbon failed after only a few hours of service.

DESCRIPTION OF THE PREFERRED EMBODIMENTS

The threaded connection according to the present invention can be used to join a wide variety of piping members. The more common of these members include tubing, couplings, fittings, instruments, valves, nozzles, burst plates, meters, plugs, and similar devices. The invention finds particularly advantageous application in joining flow nozzles to high pressure drilling bits. Description of the nozzle and bit assembly will serve to illustrate but one of the many embodiments of the present invention.

Figure 1:
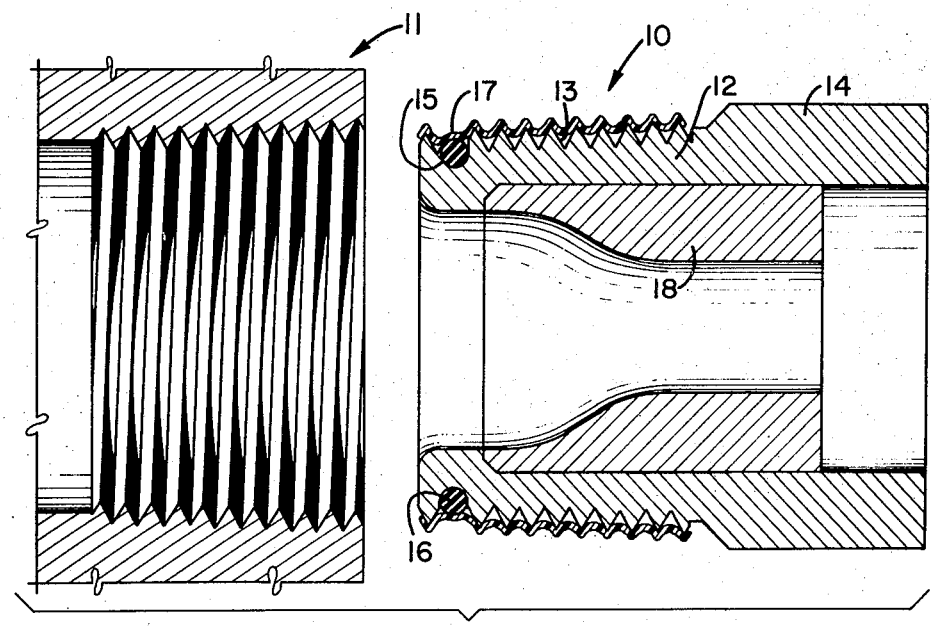
FIG. 1 is an exploded view of two members capable of being joined by the connection of the present invention, the two members being shown in longitudinal section.
Figure 2:
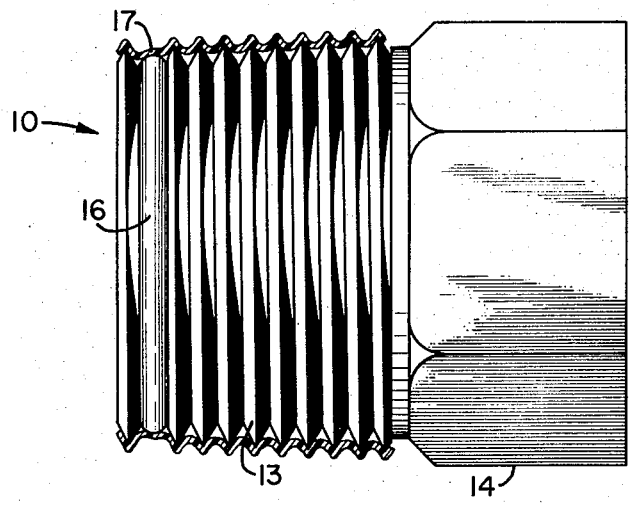
FIG. 2 is a side elevational view of the externally threaded members shown in FIG. 1 with portions cut away to illustrate details of the gasket and groove.

Referring to FIG. 1, an externally threaded member 10 is shown in axial alignment with an internally threaded member 11 preparatory to screwing the two members together. The externally threaded member 10 is in the form of a steel sleeve 12 provided with a threaded section 13 and a hex head 14. A peripheral groove 15 extends circumferentially around the member 10 and is bound on either side by threads of the threaded section 13. A one-piece, continuous rubber gasket 16 is received in the groove 15. The groove and gasket, preferably, are complementary shaped. The outer extremity of the gasket 16 projects beyond the roots of the external threads and preferably beyond the pitch diameter of the threads. A thin ribbon 17 composed of a fluorocarbon resin or fluorinated ethylene-propylene resins is positioned in protective relation about the gasket 16 and extends laterally over at least one thread on either side of the groove 15. The ribbon 17 not only serves as a protective covering for the rubber gasket 16 but also improves the quality of the pressuredtight seal. At high closure stresses, the fluorocarbon resin undergoes plastic deformation and cold flows into intimate contact with the irregular thread surfaces.

When the internal threads of the latter bridge the groove of the former. The member 10 is screwed into the member 11, the gasket 16 and ribbon 17 deform forming a pressurized seal in the cavity defined by the groove walls and the internal threads opposite the groove 15.

The gasket 16 is sized in relation to the cavity so that it is compressed sufficiently to provide a relatively high packing pressure in the space separating the two members 10 and 11. For a pressure-tight connection, the packing pressure must be higher than the internal fluid pressure. The packing pressure attainable by compressible gasket can be calculated from the bulk modulus equation:

$$P = M_b (V_1 - V_2)/V_1$$

where $P$ is the packing pressure in psi;

$M_b$ is the bulk modulus of the gasket material in psi;

$V_1$ is the volume of the unstressed gasket in cubic inches; and $V_2$ is the volume of the cavity confining the gasket in cubic inches.

In designing the packing assembly according to the present invention, the cavity is sized to provide a volume ratio $(V_1-V_2)/V_1$ of between about 0.05 and 0.30. For a gasket composed of rubber having a bulk modulus of about 300,000 psi, this provides a packing pressure from about 15,000 to about 90,000 psi.

As mentioned previously, the external threads should be taper threads. The shape and dimensions of the taper threads can conform to American standard taper threads cut to a taper of 1/16 inch per inch. The internal threads of member 11 can be straight pipe threads but preferably are also taper threads. The preferred taper threads for both members 10 and 11 are American standard Dryseal pipe threads which in form and dimensions are generally the same as the American standard taper threads except for a difference in the thread roots and crests.

Since the gasket 16 must exhibit a high degree of deformability in achieving the pressure-tight seal, and since it must be stretched over the threads in being placed in the groove, it must be composed of an an elastomeric material. Plastics are unsuited for the purposes of the present invention because they tend to extrude between the threads under the high stresses encountered in the pressure packed zone.

The gasket 16 can be molded from a wide variety of elastomers including natural rubber, polyisoprene, polybutadiene, styrene-butadiene copolymer, ethylene-propylene copolymer, acrylonitrile-butadiene copolymer (nitrile), chloroprene (Neoprene), silicone, fluoroelastomers, and the like. The selection of a particular type of elastomer will depend, in part, upon the service conditions including temperature range, type of fluids being handled, and packing pressure imposed on the gasket 16. Although the gasket 16 can take a variety of shapes, the common O-ring form is preferred because of its availability. O-rings can be purchased in accordance with manufacturer's standards in a variety of sizes ranging from about 0.1 to more than 15 inches in outside diameter and in size increments differing by 0.125 inches. As applied in nozzle service, the O-rings normally will be between about 0.25 inches and 1 inch in size.

Polytetrafluoroethylene resin, the preferred ribbon material, is available in tape form having a thickness between about 1 and 20 mils. The longitudinal strength of such tape normally is greater than the transverse strength so that when the tape is stretched around the externally threaded member 10, it tends to conform generally to the configuration of the threads and O-ring. The tape normally will be wrapped one or more times around the threaded member to completely cover the groove 15 and O-ring 16 contained therein. Good results have been obtained by using tape having a thickness of 2.5 mils and a width of ¼ inch. This tape is wrapped around the groove 15 and O-ring 16 to provide 4 layers which extends 1 or 2 teeth on either side of the groove 15. With this achieved, the entire threaded section can then be covered with 1 layer of the polytetrafluoroethylene tape.

As indicated above, it is quite important to size the groove 15 in relation to the size of the O-ring 16 in order to achieve the proper packing pressure at the interface of the mated threads. The size determination can be facilitated by using a cross sectional layout of the assembly such as that shown in FIG. 3. Using this layout the determination can be as follows (O-ring stretch and tape thickness are ignored in calculation):

1. Select an O-ring size for the externally threaded member to be connected. This determines both the cross sectional area of the O-ring and the width of the groove.

2. Locate the center line, e.g., 19, of the groove on the layout at a point which provides threads on both sides of the groove.

3. Sketch in the outline of the groove having a semicircular bottom, the radius of which is equal to the radius of the O-ring.

4. Sketch in lines, e.g. 20 and 21, to divide the enclosed area into triangles, a semicircle, and a rectangle.

5. Determine the dimension (h) separating lines 20 and 21 by the following equation:

$$h = A_1(R) - A_2 - A_3/W$$

Figure 3:
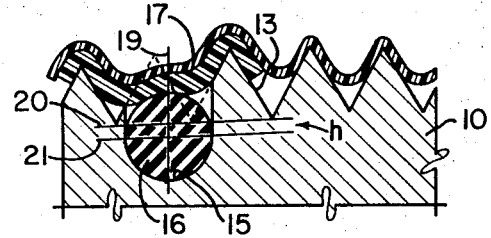
FIG. 3 is an enlarged fragmentary view of the externally threaded member of FIG. 1 illustrating details of the fluoroplastic ribbon in relation to the gasket and threads.

$A_1$ is the cross sectional area of the O-ring;

$R$ is the desired gasket compression ratio $(V_2/V_1)$, usually between 0.70 and 0.95;

$A_2$ is the area of the triangles (cross sectional area of the teeth shown in phantom in FIG. 3);

$A_3$ is the area of the semicircle (bottom of the groove);

$W$ is the width of the groove (also the diameter of the O-ring).

The dimension $h$ is the only unknown dimension of the groove and can readily be calculated from the above equation. This dimension added to the radius of the O-ring gives the depth of the groove as measured from the root of the external threads. Knowing the inside diameter of the groove permits selecting the inside diameter of the O-ring. The O-ring normally should have an inside diameter slightly less than that of the groove to provide frictional engagement between the two.

The invention is particularly useful in mounting nozzle assemblies to high pressure drilling bits. High pressure drilling bits are normally designed to withstand internal fluid pressures in the range from 10,000 to 20,000 psi. Nozzles are used on high pressure bits to develop hydraulic jets of sufficient velocity to disintegrate or fragment earth formations. Because of the severe erosional effects of the high velocity jets, the nozzle assembly is provided with a wear resistant insert, e.g., the ceramic member 18 of FIG. 1. This insert is normally secured to the metal sleeve by a brazing alloy. The alloy preferentially wets the ceramic insert 18 and the steel sleeve 12 and upon coelescing fuses the two members together. This assembly then must be attached to a steel bit for service. The assembly cannot be connected by a welded joint because the high temperature welding would destroy the ceramic-to-metal bond. Threaded connections without gaskets were found to provide insufficient sealing capabilities for prolonged high pressure service. Threaded connections with gaskets in accordance with prior art techniques were found to be unreliable. The present invention has solved the problem and has produced a high pressure nozzle assembly of unusual reliability.

The following example illustrates the manner in which a nozzle assembly was prepared in accordance with the present invention. An A.I.S.I. 4140 lead steel bar was machined to provide a sleeve with the configuration shown in FIG. 1. The sleeve was 1-1/32 inches in length and had ½ inch American standard Dryseal pipe threads (taper). A ⅜ inch diameter tungsten carbide insert was brazed to the internal surface of the sleeve using a silver brazing alloy. An O-ring having a width of 0.103 inches was selected as the gasket for the sleeve. The center line of the groove was located 0.142 inches from the outer end of the threaded section. In accordance with the procedure described earlier, the groove inside diameter was calculated to be 0.595 inches. A compression ratio ($R$) of 0.9 was used in these calculations. A 0.103 inch wide groove was cut in the sleeve using a convex cutter. An O-ring having an inside diameter of 0.549 inches was selected and mounted in the groove. One-quarter inch wide polytetrafluoroethylene tape (sold under the trademark Teflon) 2.5 mils thick was then wrapped around the externally threaded section 4 times to cover the groove and O-ring. The lateral extent of the four layers was at least one thread on both sides of the groove. One-half inch polytetrafluoroethylene tape was then applied to substantially cover the external threads. The nozzle assembly then was screwed into an internally threaded member provided with ½ inch American standard Dryseal pipe threads (taper). With the internal opening plugged, the nozzle assembly was pressure tested for about 12 hours. The nozzle assembly maintained 15,000 psi of static pressure for the entire test period.

It should be noted that an identical assembly without the polytetrafluoroethylene tape was tested and developed a leak after only a few hours of service.

Figure 4:
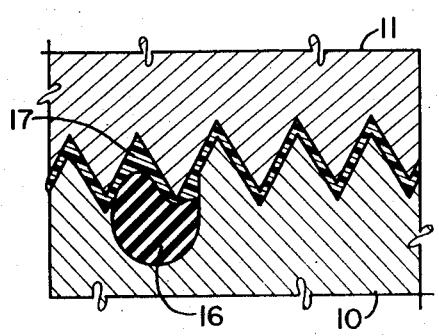
FIG. 4 is an enlarged fragmentary view showing details of the pressure seal with the two members of FIG. 1 assembled.

The nozzle assembly was then removed and cut longitudinally to investigate the configuration of the gasket and tape. The configuration was similar to that shown in FIG. 4. This section illustrates that the polytetrafluoroethylene tape under cold flow substantially filled the area between the threads even to the extent that the resin was forced into intimate contact with the roots of the threads. The polytetrafluoroethylene material appeared to extrude outwardly from the groove filling the space between the intermeshed threads. A thin film about 1 mil thick or less occupied the space between the threads. It was further observed that the rubber gasket was not cut by the internal threads.

The foregoing tests demonstrate that the polytetrafluoroethylene tape, because of its anti-stick quality and low coefficient of friction, permits the internal teeth to slide past the packing material retained in the groove as the two parts are screwed together. Moreover, as the loading on the gasket increases, the polytetrafluoroethylene tape undergoes plastic deformation and is forced into intimate contact with the internal thread roots. The rubber gasket does not undergo the plastic deformation and therefore is not extruded between the teeth at high loading pressures.

A particularly attractive feature of the assembly contemplated by the present invention is that a fluid-tight seal can be achieved by only a minor modification of an externally threaded member. Moreover, the sealing assembly can be constructed using commercially available materials. These factors combine to provide an economical connection which possesses an unusually high degree of utility.

We claim:

1. In combination an internally threaded member; an externally threaded member having formed in its outer periphery a circumferential groove, said groove being bridged by said internally threaded member, a one-piece, continuous rubber gasket mounted in said groove, a thin fluoroplastic ribbon extending circumferentially around said externally threaded member and arranged to substantially cover said gasket and said groove, the ratio of the volume of said groove bridged by said internally threaded member to the volume of said gasket in an unstressed condition being between about 0.70 and about 0.95.

2. The invention as defined in claim 1 wherein the fluoroplastic is polytetrafluoroethylene.

3. The invention as defined in claim 1 wherein the threads of the externally threaded member are taper threads.

4. The invention as defined in claim 3 wherein the threads are Dryseal taper threads.

5. The invention as defined in claim 1 wherein the groove is configurated in relation to said gasket to provide complementary shaped contact surface between said gasket and said externally threaded member.

6. The invention as defined in claim 5 wherein the gasket is an O-ring and said groove has a semicircular bottom, the radius of which is about equal to the radius of said O-ring.

7. The invention as defined in claim 2 wherein the thin polytetrafluoroethylene ribbon is between about 1 and 20 mils in thickness.

8. The invention as defined in claim 7 wherein said polytetrafluoroethylene ribbon is polytetrafluoroethylene tape wrapped around said externally threaded member to provide a plurality of layers covering said gasket and said groove.

9. A nozzle assembly adapted to be connected to an internally threaded section formed in a drill bit, said assembly comprising: a steel sleeve having an externally threaded section and a circumferential groove formed in an intermediate portion of said externally threaded section; a continuous, one-piece rubber gasket mounted in said groove and being dimensioned to substantially fill said groove, the outer periphery of said gasket being located between the pitch line and the crests of the external threads; a thin polytetrafluoroethylene protective ribbon covering said groove and said gasket contained therein; and a ceramic insert and means securing said insert to the interior of said steel sleeve.

10. The invention as defined in claim 9 wherein the rubber gasket is an O-ring.

11. The invention as recited in claim 10 wherein the O-ring is sized in relation to said groove to be compressed to a volume from 95 to 70 percent of its original volume when the nozzle assembly is connected to said drill bit.

12. The invention as defined in claim 9 wherein the threads of said externally threaded member are taper threads.

* * * * *